United States Patent
Nemoto et al.

(10) Patent No.: US 6,651,033 B2
(45) Date of Patent: Nov. 18, 2003

(54) AUTOMATIC WORKFLOW MONITORING/CONTROL METHOD AND APPARATUS

(75) Inventors: Tsuyoshi Nemoto, Yokohama (JP); Mitsuharu Nagayama, Yokohama (JP); Kazuyuki Ichikawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/987,851

(22) Filed: Nov. 16, 2001

(65) Prior Publication Data

US 2002/0133315 A1 Sep. 19, 2002

(30) Foreign Application Priority Data

Mar. 13, 2001 (JP) ........................................ 2001-071182

(51) Int. Cl.⁷ ............................................... G06F 11/30
(52) U.S. Cl. ...................................... 702/182; 702/187
(58) Field of Search ............................. 700/90, 91, 95, 700/108, 111; 702/182, 187

(56) References Cited

U.S. PATENT DOCUMENTS

| | | | | |
|---|---|---|---|---|
| 3,703,725 A | * | 11/1972 | Gomersall et al. | 700/97 |
| 5,093,794 A | * | 3/1992 | Howie et al. | 700/100 |
| 5,751,580 A | * | 5/1998 | Chi | 700/101 |
| 6,415,259 B1 | * | 7/2002 | Wolfinger et al. | 705/8 |

FOREIGN PATENT DOCUMENTS

JP  11213082  8/1999

* cited by examiner

Primary Examiner—Marc S. Hoff
Assistant Examiner—Craig Miller
(74) Attorney, Agent, or Firm—Antonelli, Terry, Stout & Kraus, LLP

(57) ABSTRACT

In a workflow system performing works by circulating data to a plurality of staffs via a network, a processing history of a workflow case is recorded and processing histories are collected. A processing situation in the workflow system is checked by using he processing histories collected. In case the situation check decides that a delay is present, case entry is suppressed so as to control a case amount and a work amount.

3 Claims, 8 Drawing Sheets

FIG.3

| DATE / TIME (301) | INFORMATION TYPE (302) | MESSAGE (303) |
|---|---|---|
| 2000/01/01 00:00:00.000 | ACTIVATION | MANAGEMENT APPARATUS |
| 2000/01/01 00:01:30.500 | START | CASE 1 |
| 2000/01/01 00:01:31.000 | STRAT | WORK 1 |
| 2000/01/01 00:02:10.200 | INFORMATION | READ ERROR IN WORK 1 |
| 2000/01/01 00:02:20.000 | END | WORK 1 |
| 2000/01/01 00:02:20.500 | START | WORK 2 |
| 2000/01/01 00:04:10.242 | END | WORK 2 |
| 2000/01/01 00:04:10.500 | END | CASE 1 |
| 2000/01/01 00:04:10.600 | START | CASE 2 |
| 2000/01/01 00:04:11.000 | START | WORK 3 |
| ... | ... | ... |

| SYSTEM NAME 701 | WORK NAME 702 | THRESHOLD VALUE 703 |
|---|---|---|
| sys 1 | WORK 1 | 00:05:00.000 |
| sys 1 | WORK 2 | 00:03:00.000 |
| . . . | . . . | . . . . . . |

# AUTOMATIC WORKFLOW MONITORING/CONTROL METHOD AND APPARATUS

BACKGROUND OF THE INVENTION

The present invention relates to an automatic workflow monitoring/control method and apparatus, and particularly to a method and apparatus for controlling the number of cases being circulated and a work amount therefor.

A workflow system is used as an infrastructure for improving document circulation in an office. The workflow system is realized by defining in advance a work called a business process to be performed by a plurality of staffs and circulating data (electronic documents, files, programs and the like) required for respective staffs to perform their "cases", according to the definition of the business process, so that each of the staffs can perform his/her case.

For example, JP-A-11-213082 discloses a technique for effectively processing cases in the workflow system. This technique enables to even the load by a plurality of workflow support means when the number of cases or the work amount is increased.

That is, the aforementioned conventional technique can cope with increase of the cases to be processed in the workflow system and the work amount involved in the cases. However, no consideration is taken on control of the number of cases and the work amount. Since the computer resources are not infinite, if the number of cases and the work amount continue to increase, there is a danger of reaching limitation and it is necessary to control the number of cases and the work amount.

SUMMARY OF THE INVENTION

It is therefore an object of the present invention to provide a method, an apparatus, and a program capable of automatically detecting the processing state in the workflow system and controlling the number of cases and work amount by suppressing entering of cases when a delay is present.

In order to achieve the aforementioned object, the present invention provides an automatic workflow monitoring/control method in a workflow system performing works by circulating data to a plurality of staffs via a network, the method comprising steps of: recording a processing history of a workflow case; collecting processing histories recorded; checking a processing situation in the workflow system by using the processing histories collected; and controlling a case amount and a work amount by suppressing case entry in the workflow system in a case the situation check step decides that a delay is present.

According to another aspect of the present invention, there is provided an automatic workflow monitoring/control apparatus in a workflow system performing works by circulating data to a plurality of staffs via a network, the apparatus comprising: means for recording a processing history of a workflow case; means for collecting processing histories recorded; means for checking a processing situation in the workflow system by using the processing histories collected; and means for controlling a case amount and a work amount by suppressing case entry in the workflow system in a case the situation check step decides that a delay is present.

According to still another aspect of the present invention, there is provided an automatic workflow monitoring/control program in a workflow system performing works by circulating data to a plurality of staffs via a network, the method comprising steps of: recording a processing history of a workflow case; collecting processing histories recorded; checking a processing situation in the workflow system by using the processing histories collected; and controlling a case amount and a work amount by suppressing case entry in the workflow system in a case the situation check step decides that a delay is present.

BRIEF DESCRIPTION OF THE DRAWINGS

FIG. 3 shows a data configuration of a trace file.

DESCRIPTION OF THE EMBODIMENTS

Description will now be directed to embodiments of the present invention with reference to the attached drawings.

Figure 1:
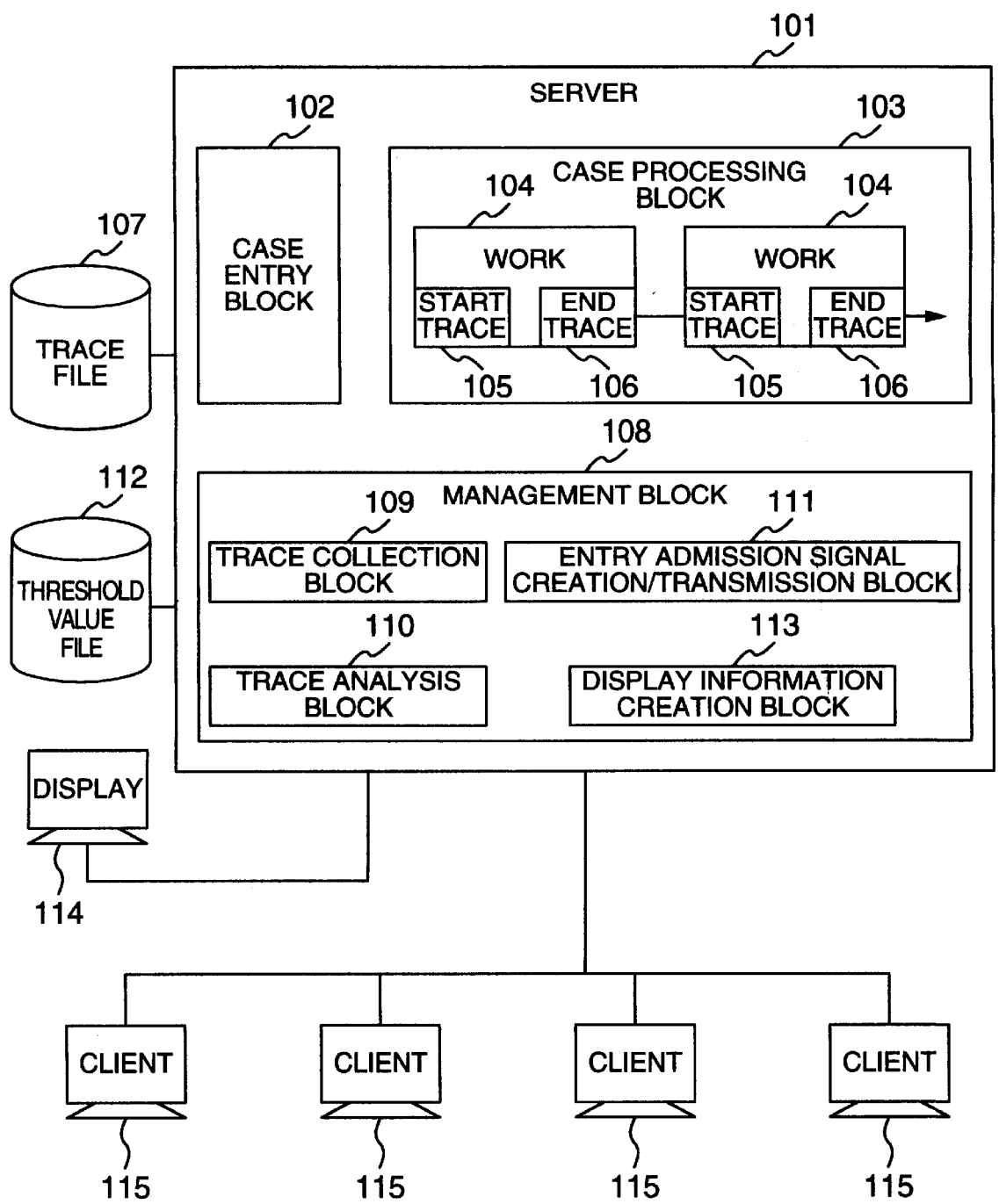
FIG. 1 shows configuration of a workflow system and a workflow system management apparatus.

FIG. 1 shows a workflow system according to an embodiment of the present invention. This system includes a server 101 and a plurality of clients 115. It should be noted that it is possible to use a plurality of servers 101. The server 101 is connected to a trace file 107, a threshold value file 112, and a table display unit 114.

The server 101 includes a case entry block 102, a case processing block 103, and a managing block 108. The server 101 has a business process in which a flow of work to be performed by a plurality of staffs is defined in advance. The case entry block 102 creates and input a case based on the business process defined in advance. The case processing block 103 processes the case entered from the case entry block 102. That is, data (electronic documents, files, programs, and the like) required for respective staffs to perform a work called "case" is circulated according to the definition of the business process. Works 104 are delivered to the respective staffs as the clients 115 connected to the server 101. Upon start of a work, a start trace output block 105 writes the work start into the trace file 107. Upon completion of the work, an end trace output block 106 writes the work end into the trace file 107. A data configuration of the trace file 107 recording a processing history will be detailed later with reference to FIG. 3. It should be noted that when processing a case, there is a case when the case is transmitted to the client according to a request from the client 115 and there is a case when the case is transmitted to the client 115 without a request from the client 115. In either of the cases, the work start is a moment when the case has been transmitted to the client 115 and the work end is a moment when the case has been transmitted from the client 115. Moreover, a client can determine the case processing (for example, at the moment when a file is opened and closed) as the work start and the work end.

The management block 108 includes a trace collection block 109, a trace analysis block 110, an entry admission signal creation/transmission block 111, and a display information creation block 113. The trace collection block 109 collects the trace file 107. The trace analysis block 110 analyzes the trace file 107 collected by the trace collection block 109 and creates trace analysis data. The entry admission signal creation/transmission block 111 uses the trace analysis data created by the trace analysis block 110 and transmits an entry admission signal to the case entry block 102. The display information creation block 113 creates information required for displaying a state of the workflow system on the display unit 114 according to the trace analysis data created by the trace analysis block 110.

The entry admission signal creation/transmission block 111 reads the threshold value file 112 as an index for deciding whether to transmit the entry admission signal. By comparing a threshold value in the threshold value file 112 to the trace analysis data created by the trace analysis block 110, it is decided whether to transmit the entry admission signal. The trace analysis data has a data configuration detailed in FIG. 5 and the threshold value file 112 has a data configuration detailed in FIG. 7.

Figure 2:
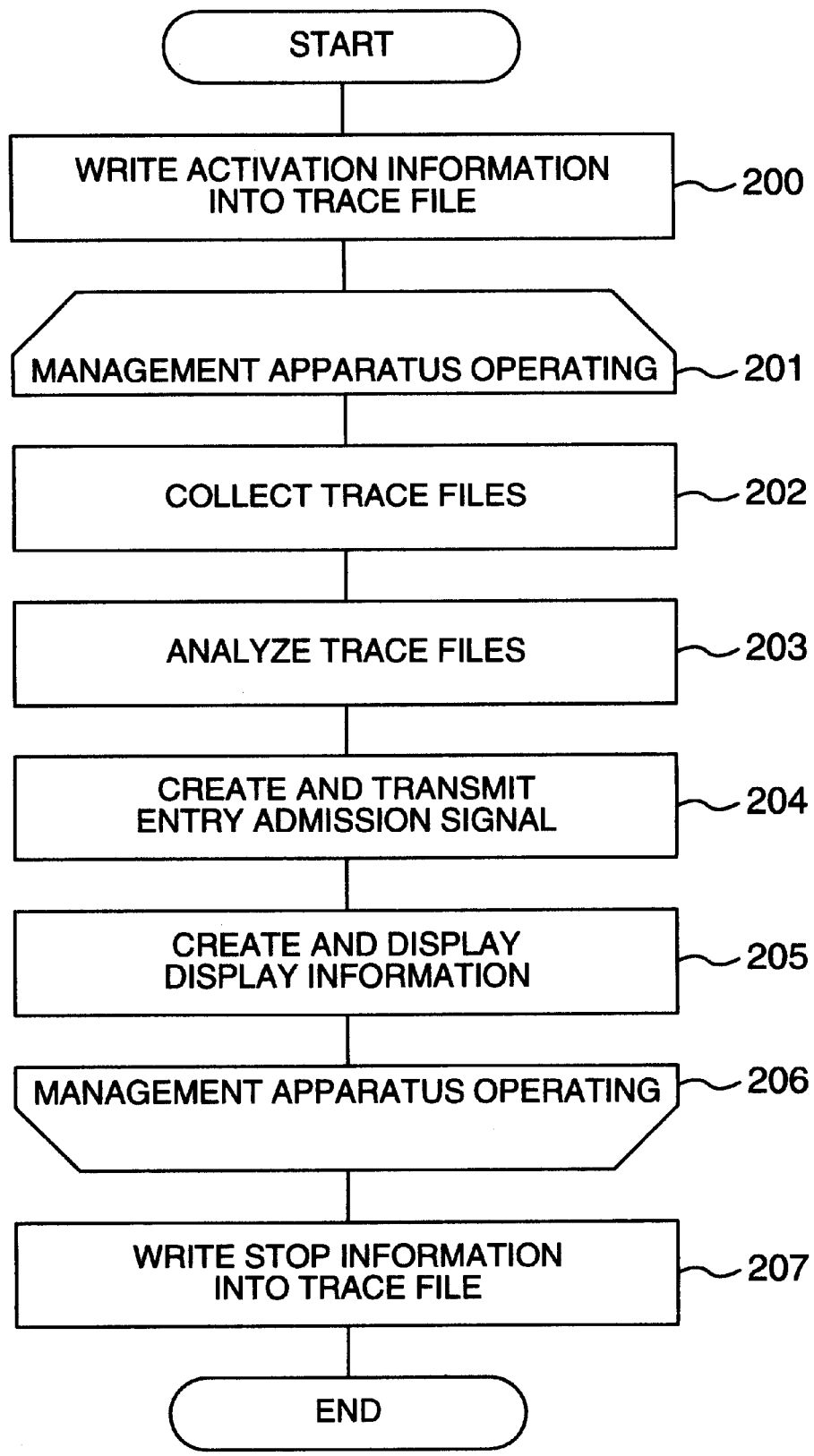
FIG. 2 is a flowchart showing a processing flow of the management apparatus.

FIG. 2 is a flowchart showing a processing flow of the management block 108. Firstly, the management block 108 writes into the trace file 107 that the management block 108 is activated (step 200). Next, the trace collection block 109 collects the trace file 107 (step 202). In a case the workflow system provides a trace information collection utility, it can be utilized for collecting the trace file 107. In a case the trace file 107 is on a file system shared by the workflow system 101 and the management block 108, the trace file 107 is analyzed and a trace analysis data (501 or 502 in FIG. 5 which will be detailed later) is created (step 203). The analysis performed by the trace analysis block 110 will be detailed later with reference to FIG. 4.

Subsequently, by using the trace analysis data 501 or 502 obtained in step 203 and the threshold value file 112, the entry admission signal creation/transmission block 111 creates the entry admission signal and transmits the entry admission signal to the case entry block 102 of the workflow system 101 (step 204). The processing flow of the entry admission signal creation/transmission block 111 will be detailed in FIG. 6 while the processing flow of the case entry block 102 will be detailed in FIG. 8.

Figure 9:
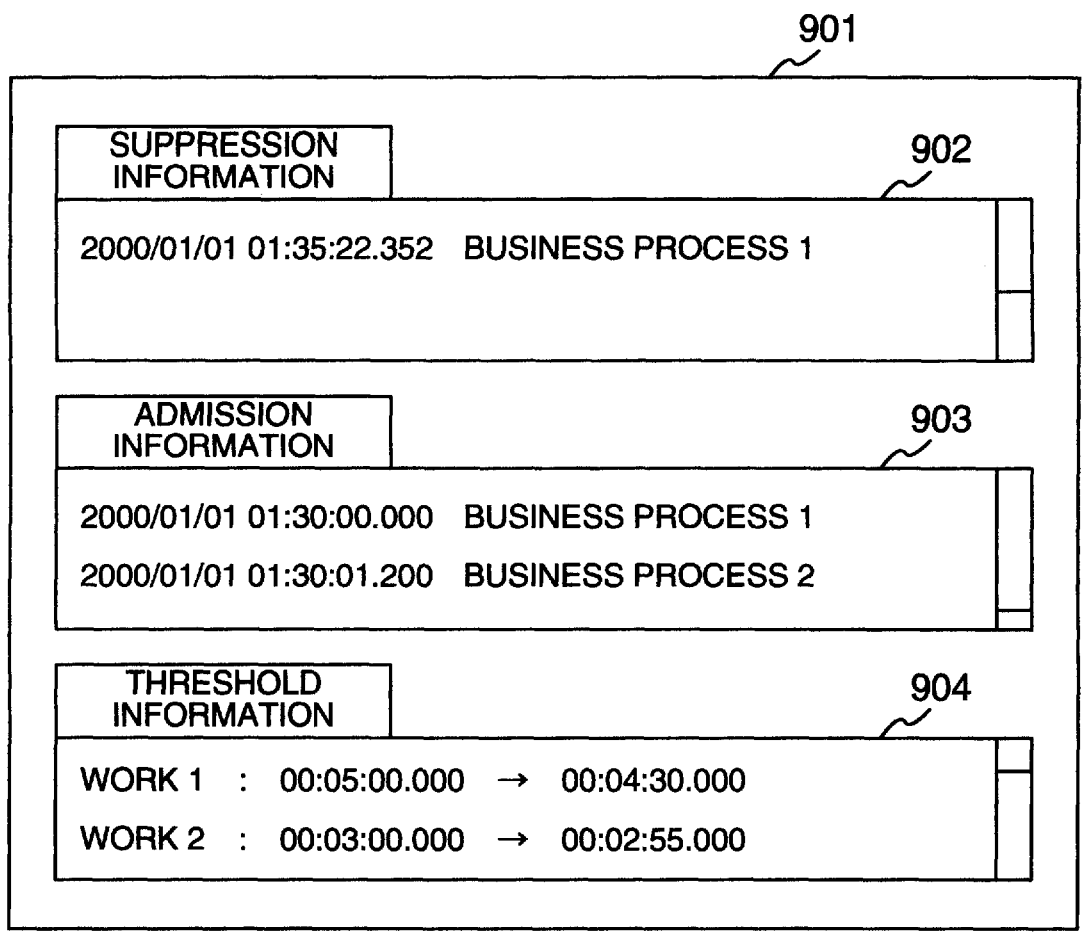
FIG. 9 shows a display example on a display unit.

Furthermore, according to the trace analysis data 501 or 502 created in step 203 and the decision made in step 204, the display information creation block 113 creates information to be displayed on the display unit 114 and makes the display unit 114 to display the information (step 205). The information may be displayed in a form of graph or table. FIG. 9 shows an example of the display.

The management block 108 automatically repeats the aforementioned steps 202 to 205 (step 201, step 206).

To terminate operation of the management block 108, the fact that the management block 108 has terminated is written into the trace file 107 (step 207) and the processing is terminated.

FIG. 3 shows a data configuration of the trace file 107. The trace file 107 is a text file consisting of a plurality of lines, each line having a date/time 301, an information type 302, and a message 303.

The date/time 301 indicates the date/time when the trace is output to the trace file 107. The information type 302 indicates what kind of information is output to the trace: start, end, information, activation, or stop. "Start" indicates a trace associated with start of the processing. "End" indicates a trace associated with termination of the processing. "Information" indicates a trace of information associated with the processing such an error message and warning. "Activation" indicates a trace associated with activation of the management block 108. "Stop" indicates a trace associated with stop of the management block 108. The message 303 indicates information which has been output by the processing such as a case name, a work name, contents of an error message, and the like.

FIG. 3 shows an example in which the management block 108 is activated at 2000 (year), January (month), 1 (day), 0 (hour), 0 (minute), 0 (second), 000. Moreover, this example shows that case 1 was started at 2000(year), January (month), 1 (day), 1 (minute), 30 (seconds), 500; work 1 was started at 2000 (year), January (month), 1 (day), 0 (hour), 1 (minute), 31 (seconds), 000; a read error occurred in work 1 at 2000 (year), January (month), 1 (day), 0 (hour), 2 (minutes), 10 (seconds), 200; and work 1 was completed at 2000 (year), January (month), 1 (day), 2 (minutes), 20 (seconds), 000. Furthermore, this example shows that work 2 was started at 2000 (year), January (month), 1 (day), 2 (minutes), 20 (seconds), 500; work 2 was completed at 2000 (year), January (month), 1 (day), 0 (hour), 4 (minutes), 10 (seconds), 242; and case 1 was completed at 2000 (year), January (month), 1 (day), 0 (hour), 4 (minutes), 10 (seconds), 500.

Figure 4:
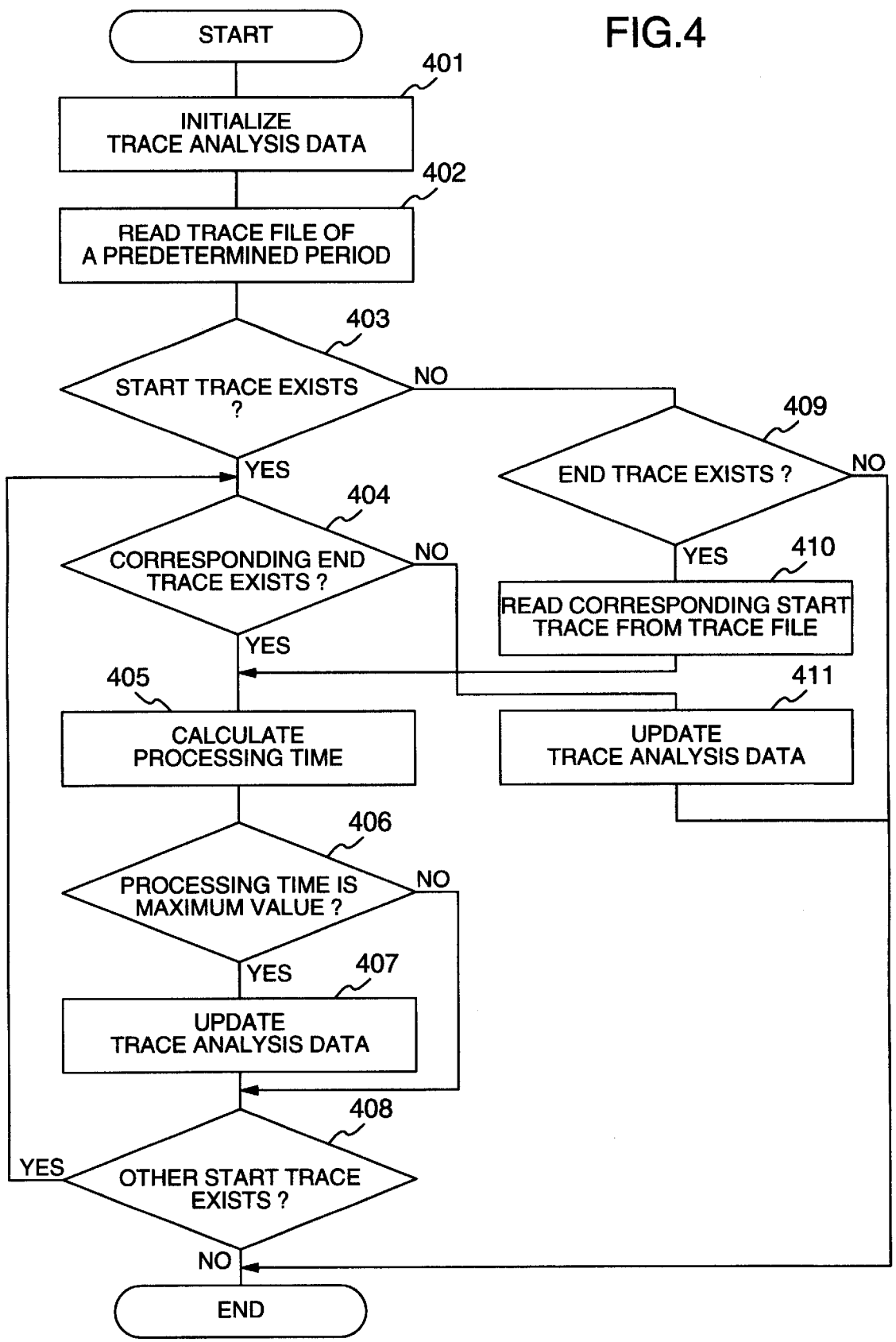
FIG. 4 is a flowchart showing a processing flow of a trace analysis block.

FIG. 4 is a flowchart showing a processing flow of the trace analysis block 110.

Firstly, the trace analysis data is initialized (step 401). The initialization makes the processing time of the trace analysis data 501, 502 blank (empty). Next, data of a predetermined time is collected from the trace file 107 (step 402). This predetermined time is a time interval of 5 minutes preceding the current time and this value may be set any way. Next, the collected data of the trace file 107 is retrieved to find a line having the information type 302 set to "start" (step 403). Here, for the case when no line has the information type 302 set to "start", explanation will be given later. When a line having the information type 302 set to "start" is found in step 403, retrieval is performed to find a corresponding line having the information type 302 set to "end" (step 404). If the corresponding end trace is found ("YES" in step 404), the trace of step 403 and the trace of step 404 are used to calculate a processing time between them (step 405). Subsequently, the processing time is compared to the trace analysis data 501 or 502 to determine whether the processing time is the current maximum value (step 406). If the time is the maximum value, then the trace analysis data 501 or 502 is updated to the information calculated in step 405 (step 407). Otherwise, the trace analysis data 501 or 502 is not updated.

Next, the collected data is again retrieved to find whether another line has the information type 302 set to "start" (step 408). If yes, then control is returned to step 404. If no, then the processing is terminated. Thus, it is possible to obtain a currently maximum processing time from the data collected from the trace file 107.

Moreover, in a case the data fetched from the trace file 107 has no line having the information type set to "start" ("NO" in step 403), retrieval is performed to find whether any line has the information type set to "end" (step 409). If yes, then a corresponding line having the information type set to "start" is read from the trace file (step 410) and the processing of step 405 and after are performed. In a case it is found that no line has the information type set to "end" in step 409, the processing is terminated as it is. In this case, since the collected data contains no "start" data or "end" data, the trace analysis data remains in the initial setting state.

Moreover, in a case the trace file 107 contains no line having the information type 302 set to "end" corresponding to the line found in step 403 ("NO" in step 404), the work is terminated at the moment when the trace file 107 is collected. As analysis data to show this situation, the trace data 501 or 502 is updated to data of the processing interval 506 "- - - " (step 411).

The processing of FIG. 4 creates as trace analysis data: data having the maximum processing time loaded, data having no processing time loaded, or data having processing time "- - - " loaded.

Figure 5:
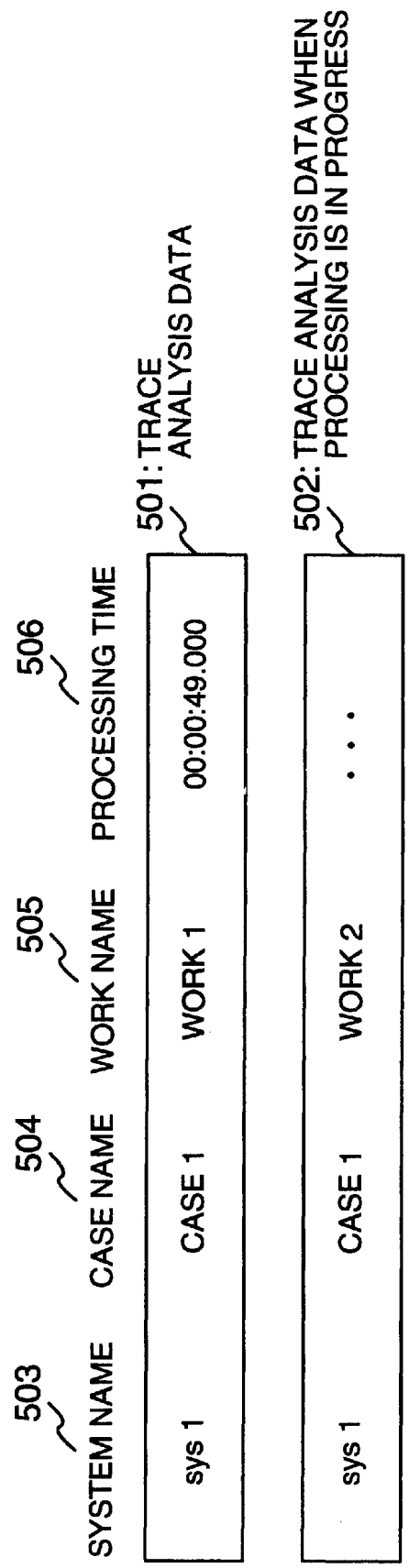
FIG. 5 shows a data configuration of trace analysis data.

FIG. 5 shows a data configuration of the trace analysis data 501 or 502 used by the trace analysis block 110 and the entry admission signal creation/transmission block 111. Each of the trace analysis data includes a system name 503, a case name 504, a work name 505, and a processing time 506. The system name 503 indicates which system has been traced by the trace file 107 that has obtained the analysis data. The case name 504 indicates which case is associated with that analysis data. The work name 505 indicates which work is associated with that analysis data. The processing time 506 indicates the time required for performing that work. In a case the time required for the processing cannot be calculated, the time is marked by "- - - ". Moreover, if neither of "start" or "end" was found from the collected data, the column is left blank (empty).

The trace analysis data 501 is an analysis data when a work had been terminated at the moment when the trace file 107 was collected and the processing time could be calculated. The trace analysis data 502 is an analysis data when a work was being performed at the moment when the trace file 107 was collected and the processing time could not be calculated.

FIG. 5 shows an example of the trace analysis data 501 in which work 1 in case 1 on sys 1 required 49 seconds.

Figure 6:
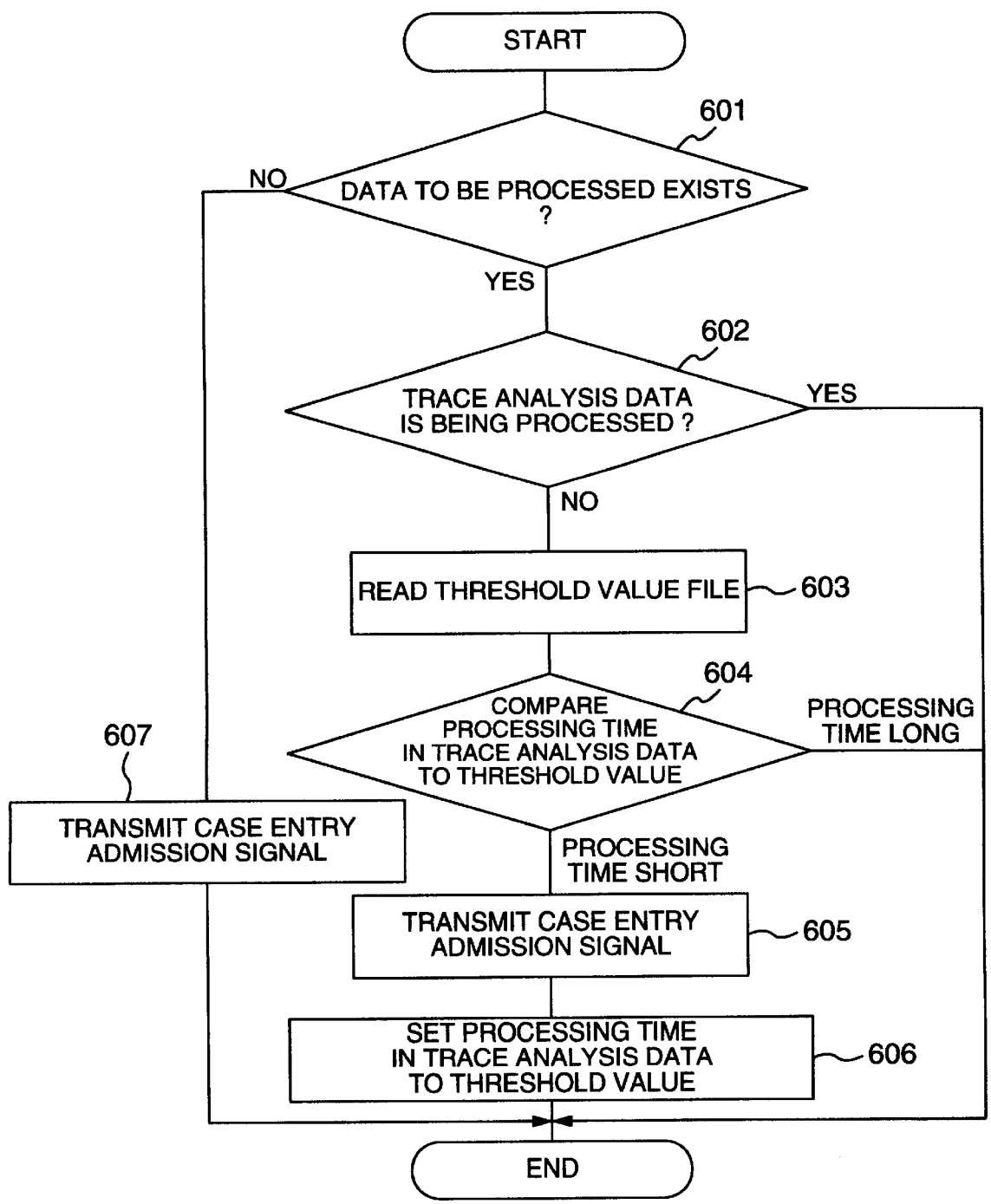
FIG. 6 is a flowchart showing a processing flow of an entry admission signal creation/transmission block.

FIG. 6 is a flowchart showing a processing flow of the entry admission signal creation/transmission block 111.

Firstly, check is made whether data of the trace analysis data 501 or 502 exists (step 601). If no data exists, the processing time of the trace analysis data is blank. When no data is present, a case entry admission signal is transmitted to the case entry block 102 (step 607) and the processing is terminated. When data to be processed is present, check is made to determine whether the trace analysis data 501 or 502 is being processed (step 602). The state of "being processed" is a case when the processing time of the trace analysis data is "- - - ". In case of the "being processed" state (YES in step 602), it is decided that the processing is stagnating and the processing of the entry admission signal creation/transmission block 111 is terminated as it is. Otherwise (NO in step 602), the threshold value file 112 is read in (step 603). Subsequently, the content of the trace analysis data 501 is compared to the content of the threshold value file 112 (step 604). If the comparison shows that the processing time 506 of the trace analysis data 501 is greater ("processing time long" in step 604), it is decided that the processing is stagnating and the processing of the entry admission signal creation/transmission block 111 is terminated as it is. In a case the processing time 506 of the trace analysis data 501 is smaller ("processing time short" in step 604), it is decided that the processing is being performed smoothly and the case entry admission signal is transmitted to the case entry block 102 (step 604). Subsequently, the processing time 506 of the trace analysis data 501 is set as a new threshold value and the threshold value file 112 is updated (step 605). This enables to set an optimal threshold value.

Figures 7, 8:
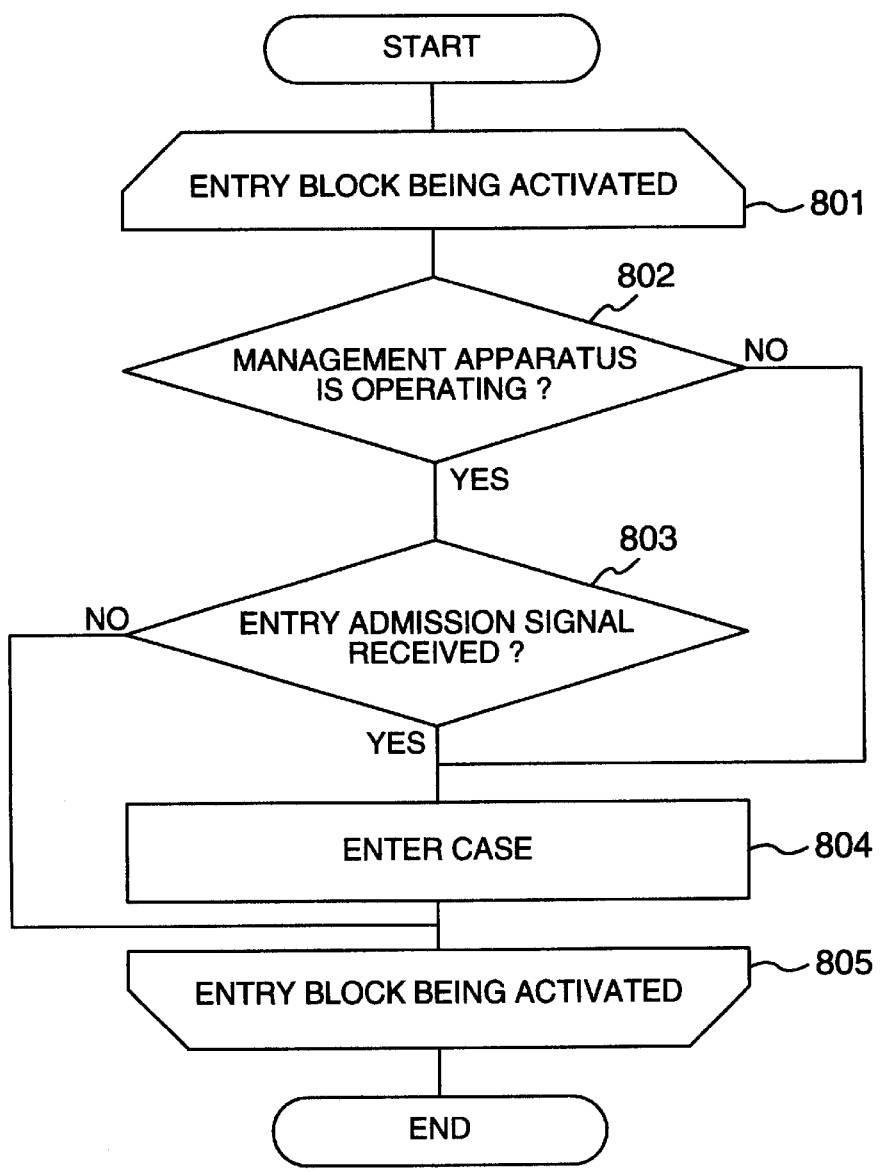
FIG. 7 shows a data configuration of a threshold value file.
FIG. 8 is a flowchart showing a processing flow of a case entry block in the workflow system.

FIG. 7 shows a data configuration of the threshold value file 112 used by the entry admission signal creation/transmission block 111. The threshold value file 112 has a threshold value for each of the works. One record contains a system name 701, a work name 702, and a threshold value 703. The system name 701 is used to identify a system in which the threshold value is valid. The work name 702 is used to identify a work in which the threshold value is valid. The threshold value 703 represents a threshold value capable of deciding that the work has been processed without stagnation.

In the example of FIG. 7, there is no problem if work 1 on sys 1 is completed within 5 minutes and work 2 on sys 1 is completed within 3 minutes.

FIG. 8 is a flowchart showing a processing flow of the case entry block 102 of the workflow system 101.

Firstly, check is made to determine whether the management apparatus 108 is in operation (step 802) by utilizing activation stop information of the management apparatus 108 written into the trace file 107. If the management apparatus 108 is operating (YES in step 802), check is made to determine whether an entry admission signal has been received (step 803). If the signal has been received (YES in step 803), a case entry is performed (step 804). Otherwise (NO in step 803), nothing is performed. If the management apparatus 108 is not operating (NO in step 802), it is decided that no management is performed and a case entry is unconditionally performed (step 804).

The case entry block 102 repeat steps 802 to 804 while being activated (steps 801, 805).

FIG. 9 shows a display example of the display unit 114 in step 205 of FIG. 2. The screen shows suppression information 902, admission information 903, and threshold value information 904. The suppression information 902 indicates presence of "business process 1" for which the case entry is suppressed. The admission information 903 indicates that the case of "business process 1" and the case of "business process 2" are allowed to be entered and are currently in operation. The threshold value information 904 indicates update information for a threshold value. It should be noted that the display example shown in FIG. 9 may also be displayed at a client side by transmitting the display content to a terminal of the client if requested by the client.

In the aforementioned embodiment, trace is output to a file. It is also possible to use a data base instead of the file.

Moreover, in step 401 of FIG. 4, a trace file of a predetermined period is read in. This predetermined period may be a maximum value of the processing time loaded in step 407. By this, data of the trace file read in step 402 always contain "start" or "end" data.

As has been described above, according to the present invention, a processing history is used whether a delay is present and if the processing is delayed due to increase of the work amount contained in the case, it is possible to control the case entry so as to suppress the case amount and the work amount itself. Moreover, in the conventional technique, if the case amount and the work amount reach a peak limit in a predetermined time zone, the computer itself may reach its peak limit. As compared to this, according to the present invention, by entering cases at different time moments, it is possible to eliminate system confusion.

What is claimed is:

1. An automatic workflow monitoring/control method in a workflow system performing works by circulating data to a plurality of staffs via a network, the method comprising steps of:

performing works by circulating data to the staffs via the network based on a plurality of business process definitions which predefine a flow of the works in the workflow system including:

recording a processing history of the works according to the business process definitions;

collecting processing histories recorded, checking a processing situation in the workflow system by using the processing histories collected, and controlling case amount and work amount of the works by suppressing case entry in the workflow system when the checking step determines that a delay is present.

2. An automatic workflow monitoring/control apparatus in a workflow system performing works by circulating data to a plurality of staffs via a network, the apparatus comprising:

means for performing works by circulating data to the staffs via the network based on a plurality of business process definitions which predefine a flow of the works in the workflow system including:

means for recording a processing history of the workflow according to the business process definitions, means for collecting processing histories recorded, means for checking a processing situation in the workflow system by using the processing histories collected, and means for controlling case amount and work amount of the works by suppressing case entry in the workflow system when said means for checking determines that a delay is present.

3. An automatic workflow monitoring/control program in a workflow system for performing works by circulating data to a plurality of staffs via a network, said automatic workflow monitoring/control program, when executed, causes the workflow system to perform the steps of:

performing works by circulating data to the staffs via the network based on a plurality of business process definitions which predefine a flow of the works in the workflow system including:

recording a processing history of the works according to the business process definitions, collecting processing histories recorded, checking a processing situation in the workflow system by using the processing histories collected, and controlling case amount and work amount of the works by suppressing case entry in the workflow system when the checking step determines that a delay is present.

* * * * *